Dec. 6, 1949    M. J. KARR    2,490,307

STOP DEVICE FOR MACHINE TOOLS

Filed Aug. 18, 1947

INVENTOR.
MICHAEL JOSEPH KARR
BY Kenyon & Kenyon
ATTORNEYS

Patented Dec. 6, 1949

2,490,307

UNITED STATES PATENT OFFICE 2,490,307

STOP DEVICE FOR MACHINE TOOLS

Michael Joseph Karr, Kalamazoo, Mich., assignor to Atlas Press Company, Kalamazoo, Mich., a corporation of Michigan Application August 18, 1947, Serial No. 769,265

1 Claim. (Cl. 77—33)

This invention relates to adjustable stop devices for machine tools, and more particularly to a quick-setting stop for a drill press or the like.

The invention provides a micro-adjustable stop device for positively stopping the travel of the working element of a machine tool, such as a drill in a drill press, at any desired predetermined position, and also provides for adjusting the stop device quickly and rapidly to different stop positions for different depths to which it is desired to machine the work material. The invention also includes mechanism for insuring against accidental movement of the stop device.

In general, the invention comprises a micro-adjustable, quick-setting stop member which is movably mounted on a stud and is adapted to be positioned thereon at various heights above a cooperating abutment stop supported on a stationary portion of the machine, the stud being connected to the reciprocatory member of the machine, such as to the quill of a drill press.

In the accompanying drawing illustrating one embodiment of the invention, Fig. 1 is a perspective view of the support table and working head portions of a drill press equipped with the new stop device;

Figure 1:
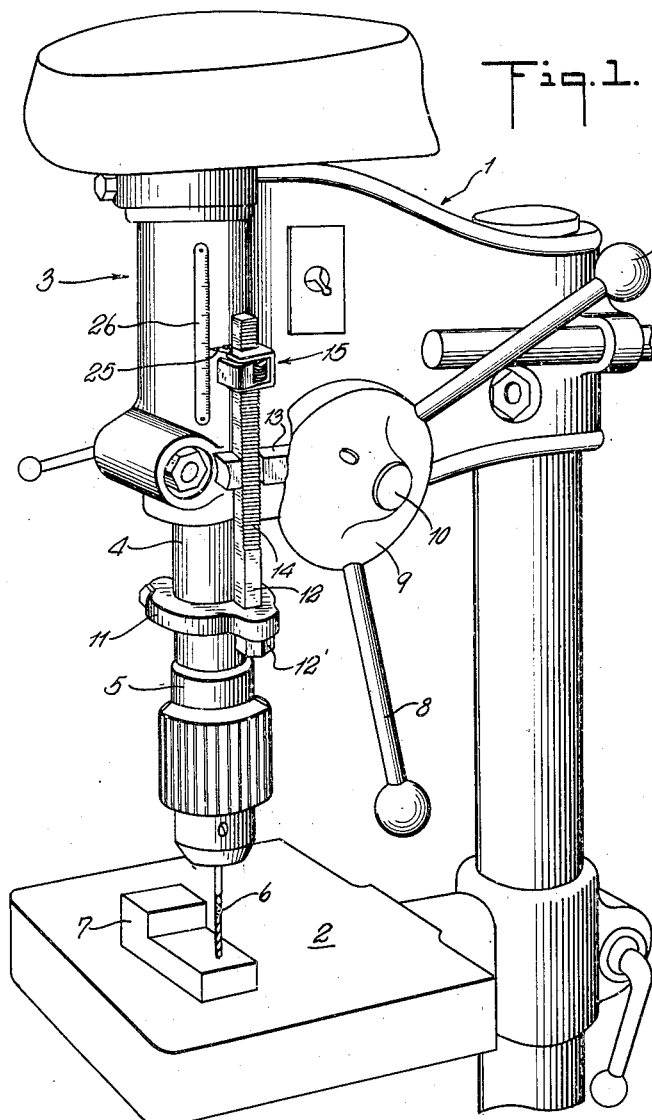

Referring to the drawings, the drill press 1 includes an adjustable work supporting table 2 and a drill head 3 in which a reciprocable quill 4 is slideably mounted. The drill spindle, provided with a collar 5, is journaled in quill 4 and carries a chuck at its lower end, within which a drill 6 is held. The work material 7 to be drilled is supported on table 2 and is disposed in the proper position beneath drill 6. The drill spindle is driven through the usual gearing, which is located within the drill head, and vertical reciprocation of quill 4 and drill 6 is controlled by handles 8 which are connected to a hub 9 fixed to the end of a shaft 10 mounted on and extending from the frame of the drill head. The front portion of hub 9 and one of the handles 8 have been broken away in Fig. 1 in order to show fully the construction and arrangement of the top device. Rotary motion imparted to shaft 10 by manual rotation of handles 8 is transferred to quill 4 through the usual rack and pinion or other equivalent mechanism.

A clamp support 11 is secured to quill 4 and serves as a mount for a bar or stud 12, the lower end of which is secured to the clamp by a bolt 12'. Stud 12 extends upwardly from clamp 11 and parallel with quill 4, passing through a slot provided in a rib projection 13 which extends from the frame of the drill head and which serves as the abutment stop. One face of the stud is provided with regularly spaced thread teeth 14, the purpose of which will be explained later. It is apparent that the bar or stud 12, being connected to quill 4 and being disposed in parallel relation thereto, moves equally with the quill as it is reciprocated toward or away from the work material.

Figure 2:
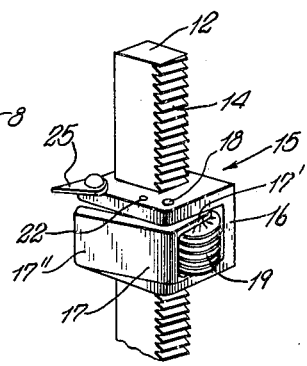
Fig. 2 is an enlarged perspective view of the upper portion of the stud and the stop member shown in Fig. 1.
Figure 3:
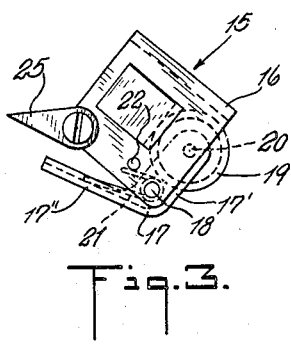
Fig. 3 is a top plan view of the stop member as shown in Figs. 1 and 2.
Figure 4:
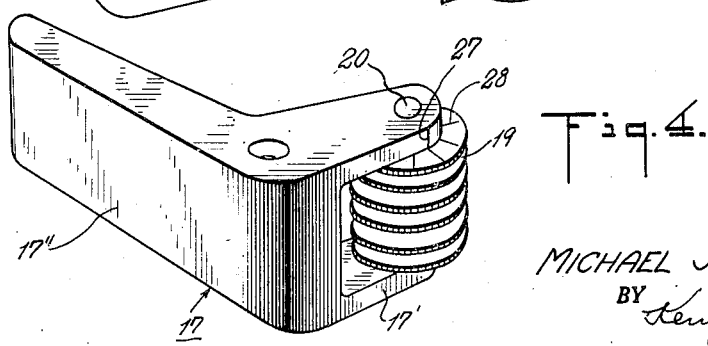
Fig. 4 is an enlarged detailed view of the support lever for the micro-adjusting worm screw.

Referring particularly to Figs. 2 and 3, a stop member 15 which is slideably mounted on stud 12, comprises a U-shaped shell or frame 16, the top and bottom faces of which are each provided with an aligned hole through which stud 12 extends. The dimensions of these holes are such as to permit the shell to move freely longitudinally relative to the stud but without permitting lateral play of the stud therein. An L-shaped lever 17, shown in Figs. 2-4, is pivotally mounted by a pin 18 between the top and bottom faces of frame 16 and the central portion of one of the angularly disposed lever arms 17' is cut away to accommodate a worm screw 19 therein, the latter being rotatably mounted on a pin 20 which extends between the top and bottom faces of this lever arm.

The threads of the worm screw are cooperatively engaged with the teeth 14 on stud 12, thereby locking the stop member to the stud or bar, and by rotating screw 19, stop member 15 may be traversed longitudinally of the bar. A spring 21 such as a coil spring is mounted around pivot pin 18 with one end pressing against the other lever arm 17'' and with the other end acting against a pin 22 which extends between the top and bottom faces of frame 16. Due to the tension of spring 21, lever 17 is normally held in a position to force worm screw 19 firmly against the toothed face of stud 11, thereby assuring positive engagement of the screw with the thread teeth and thus providing for support and retention of the stop member 15 on the stud at any desired position above the abutment stop 13. The strength of spring 21 is sufficient to prevent accidental rotation of screw 19 and to prevent accidental displacement of the stop member on the stud.

By virtue of the provision and cooperative arrangement of lever 17 and spring 21, the stop member may be rapidly set or reset at any desired position on stud 12 by manually depressing the lever arm 17" against the pressure of spring 21, thus pivoting the lever in a clockwise direction as viewed in the drawings and disengaging screw 19 from teeth 14, thereby permitting the stop member to be moved manually and freely relative to the length of stud 12 and independently of screw 19. For fine adjustment of the stop member on the stud, worm screw 19 is used, the peripheral portions of the threads thereof being knurled or serrated to provide good finger purchase thereon. To facilitate adjustment with screw 19 lever arm 17" may be depressed slightly against the pressure of spring 21 to relieve somewhat the pressure with which the screw is held against the stud.

The size and shape of frame 16 are such that the bottom face thereof comes into stopping engagement with the upper face of rib 13 as stud 12 moves downwardly with quill 4, and the strength of spring 21 is sufficient to prevent displacement of the stop member under this condition.

A pointer 25 is swingably mounted on the top face of frame 16 and is disposed to cooperate with a graduated scale 26, which is secured to the frame of the drill head, to indicate the height of the bottom face of stop member 15 above the top of the rib or abutment stop 13, and hence also thereby to indicate the permitted downward travel of the quill 4 and drill 6.

As shown in Fig. 4, a reference mark 27 is provided on the outer edge of the top face of lever arm 17', and the upper surface of the top thread of worm 19 is marked with radial graduations 28 which are an even multiple of the number of thread teeth per unit of length on stud 11. For example, if 10 teeth per inch are provided on the stud, and if the top thread of worm 19 is marked with 10 equally spaced radial graduations, the rotation of the worm from one radial graduation mark to the next with respect to reference mark 27 raises or lowers the stop member on the stud 1/100 of an inch, and hence the depth of the travel of drill 6 may be varied accordingly.

In operation, the work material 7 is locked or otherwise positioned on the support table 2 and the table is then adjusted to bring the work material within the range of travel of the drill, which is then contacted with the work material. The stop member 15 is lowered to engage the abutment stop 13 and the reading on the scale 26 indicated by pointer 25 is taken. The quick-setting lever 17 is depressed so as to disengage the worm screw from the stud and so that stop member 15 can be raised manually above the abutment stop 13 to a height approximately equal to the depth to which it is desired to drill the work material, and final adjustment of the stop member to the exact height desired is effected by rotation of screw 19. The reference mark 27 and radial graduations 28 may be utilized to effect micro-adjustment of the stop member on the stud. Thereafter, the drill press may be operated to drill the work material and the engagement of the under face of stop member 15 with the upper surface of abutment stop 13 positively prevents over-travel of the drill in the work.

In the foregoing description, I have referred to the application of the invention to a drill press and particularly as employed for effecting positive and automatic stopping of the drill press quill when it has travelled the desired distance toward the work material. However, the invention is equally applicable to other machine tools and may be adapted advantageously as automatic trip devices instead of being arranged as an automatic stop device. These and other modifications of the invention which will occur to those skilled in the art, although not specifically described herein, are within the scope and contemplation of the invention.

I claim:

In a quick-setting stop device for a machine tool having a reciprocatory member to which is connected for parallel movement therewith a bar having thread teeth formed on one face thereof, the combination of a shell slidable on said bar for longitudinal movement relative thereto, a lever having its arms angularly disposed relative to each other at an angle of about 90° and pivoted at the juncture of said arms on an axis parallel to said bar and adjacent but to one side of the thread teeth thereon, a worm screw rotatably mounted on the arm of said lever extending adjacent said thread teeth and adapted to engage said teeth, the other arm of said lever extending along the side of said shell, a spring acting on said lever and biased normally to press said screw firmly into threaded engagement with the thread teeth on said bar, whereby said shell may be locked to said bar but may be moved longitudinally relative thereto by rotation of said screw and pressure on the arm of said lever extending along the side of said shell will swing said screw to disengaged position.

MICHAEL JOSEPH KARR.

REFERENCES CITED

The following references are of record in the file of this patent:

UNITED STATES PATENTS

| Number | Name | Date |
| --- | --- | --- |
| 576,093 | Cutter | Feb. 2, 1897 |
| 600,598 | Sibley | Mar. 15, 1898 |
| 1,340,811 | Ballman | May 18, 1920 |
| 1,399,633 | Lumsden | Dec. 6, 1921 |
| 1,905,560 | Friedl | Apr. 25, 1933 |